United States Patent
Carr et al.

(10) Patent No.: US 8,685,271 B2
(45) Date of Patent: Apr. 1, 2014

(54) REFRIGERATION OIL AND COMPOSITIONS WITH HYDROCARBON REFRIGERANTS

(71) Applicants: Dale D. Carr, Morristown, NJ (US);
Jeffrey A. Hutter, Edison, NJ (US);
Richard Kelley, Princeton, NJ (US);
Roberto Urrego, Newington, CT (US);
Edward T. Hessell, Fairfield, CT (US)

(72) Inventors: Dale D. Carr, Morristown, NJ (US);
Jeffrey A. Hutter, Edison, NJ (US);
Richard Kelley, Princeton, NJ (US);
Roberto Urrego, Newington, CT (US);
Edward T. Hessell, Fairfield, CT (US)

(73) Assignee: Chemtura Corporation, Middlebury, CT (US)

( * ) Notice: Subject to any disclaimer, the term of this patent is extended or adjusted under 35 U.S.C. 154(b) by 0 days.

(21) Appl. No.: 13/759,139

(22) Filed: Feb. 5, 2013

(65) Prior Publication Data
US 2013/0200294 A1     Aug. 8, 2013

Related U.S. Application Data

(60) Provisional application No. 61/596,376, filed on Feb. 8, 2012.

(51) Int. Cl.
*C09K 5/04*     (2006.01)

(52) U.S. Cl.
USPC ......................................................... 252/68

(58) Field of Classification Search
USPC ......................................................... 252/68
See application file for complete search history.

(56) References Cited

U.S. PATENT DOCUMENTS

| | | | |
|---|---|---|---|
| 3,670,013 A | 6/1972 | Leibfried | |
| 5,486,302 A | 1/1996 | Short | |
| 6,410,492 B1 | 6/2002 | Shimomura et al. | |
| 6,444,626 B1 | 9/2002 | McHenry et al. | |
| 6,774,093 B2 * | 8/2004 | Carr et al. | 508/485 |
| 7,718,083 B2 | 5/2010 | Kaneko | |
| 8,067,345 B2 * | 11/2011 | Tokiai et al. | 508/208 |
| 2004/0063590 A1 * | 4/2004 | Gibb et al. | 508/485 |
| 2010/0117022 A1 | 5/2010 | Carr et al. | |
| 2010/0181523 A1 | 7/2010 | Kelley et al. | |
| 2010/0190672 A1 | 7/2010 | Carr et al. | |
| 2011/0240910 A1 * | 10/2011 | Carr et al. | 252/68 |
| 2012/0024007 A1 * | 2/2012 | Ota et al. | 62/468 |
| 2012/0096878 A1 * | 4/2012 | Kamishima et al. | 62/84 |

FOREIGN PATENT DOCUMENTS

| | | |
|---|---|---|
| JP | 2003-73681 | 2/2003 |
| JP | 2003041278 | 2/2003 |
| JP | 2010031134 | 2/2010 |
| JP | 2010090284 | 4/2010 |

* cited by examiner

*Primary Examiner* — John Hardee
(74) *Attorney, Agent, or Firm* — Joseph Suhadolnik; George Romanik; Chemtura Corporation (57) ABSTRACT

Polyol ester lubricant compositions comprising predominately straight chain $C_{5-10}$ alkylcarboxlate esters of neopentyl alcohols, for example, straight chain $C_{5-10}$ alkylcarboxlate esters of one or more of trimethylol propane, pentaerythritol, di-pentaerythritol, tri-pentaerythritol or pentaerythritol oligomers, and working fluids comprising said lubricant compositions and a hydrocarbon refrigerant, suitable for heat transfer devices including refrigeration and air conditioning systems are provided. The polyol ester lubricant compositions have a kinematic viscosity at 40° C. of 22-125 cSt and a viscosity index of greater than 140, and are characterized by having very high lubricity, excellent load carrying properties and excellent low temperature properties.

10 Claims, 3 Drawing Sheets

REFRIGERATION OIL AND COMPOSITIONS WITH HYDROCARBON REFRIGERANTS

This application claims benefit under 35 USC 119(e) of U.S. provisional application No. 61/596,376, filed Feb. 8, 2012, the disclosure of which is incorporated by reference.

Provided are polyol ester lubricant compositions and working fluids containing a hydrocarbon refrigerant, suitable for heat transfer devices including refrigeration and air conditioning systems, comprising a mixture of alkylcarboxy esters of neopentyl polyols, said polyols selected for example from trimethylol propane, pentaerythritol, di-pentaerythritol, tri-pentaerythritol and pentaerythritol oligomers, wherein said mixture of alkylcarboxy esters have a kinematic viscosity at 40° C. of 22-125 cSt and a viscosity index of greater than 140, and are characterized by having very high lubricity, excellent load carrying properties and excellent low temperature properties.

Heat transfer devices such as refrigerators, freezers, heat pumps and air conditioning systems are well known. In simple terms such devices operate via a cycle wherein a refrigerant of a suitable boiling point evaporates at low pressure taking heat from its surroundings, then condenses back to a liquid in a different location giving off heat to its new surroundings. In addition to the mechanical parts, such as a compressor etc, specially suited materials are needed, including refrigerant, suitable heat transfer materials and lubricants to allow for functioning of the movable parts of the device. The combination of lubricant and refrigerant in a heat transfer device is referred to as the working fluid.

There are stringent demands on the lubricant in these devices. They must have good low temperature flow properties, be thermally stable, provide protection against wear of moving parts such as bearings under load, remove heat from the compressor and seal clearances to ensure efficient compression of gas from low to high pressure etc. The refrigeration lubricant must also be compatible with the refrigerant, which typically requires good miscibility between lubricant and refrigerant under a variety of operating conditions.

Synthetic ester based lubricants are effective refrigeration lubricants in many systems. U.S. Pat. No. 6,444,626 discloses formulated fluids well suited for use as a coolant or lubricant comprising mixtures of pentaerythritol, di-pentaerythritol, tri-pentaerythritol and tetra-pentaerythritol esters as well as mixtures with the aforementioned esters and trimethylol polyol esters. The mixtures of pentaerythritol and poly-pentaerythritol esters of U.S. Pat. No. 6,444,626 are prepared from a starting polyol which is predominately mono-pentaerythritol in a two step process. The first step follows the general teaching of U.S. Pat. No. 3,670,013 by partially esterification the polyol under acidic conditions using less carboxylic acid than needed for full esterification under conditions that also lead to oligomerization of the polyol/ester. The following step completes the esterification of the hydroxy groups.

The physical properties of the ester mixtures, for example, viscosity and the like, are dependent on the types of esters and the ratio of the esters present. For example, compositions with higher amounts of di- and tri-pentaerythritol esters would have a higher viscosity than similar compositions with higher amounts of mono-pentaerythritol esters. In many large, high performance applications, high viscosity lubricants are desirable.

The number of carbon atoms and the amount of branching of the carboxylate portion of the esters has a large impact on viscosity and miscibility with various other components such as refrigerants. U.S. Pat. No. 5,486,302 discloses higher viscosity POE lubricants obtained by esterifying a polyol using branched chain carboxylic acids; unfortunately, these branched chain esters exhibit insufficient lubricity for use in certain heat transfer devices.

U.S. Pat. No. 6,774,093 discloses a refrigeration lubricant comprising esters similar to those of U.S. Pat. No. 6,444,626, but with a much higher viscosity making it suitable for use with fluorinated refrigerants.

Environmental concerns, for example, concern about ozone depletion, has lead to replacement of traditional chlorofluorocarbon refrigerants with new or alternate materials such as carbon dioxide or non-halogenated hydrocarbons. The increased use of alternate refrigerants has lead to the development of new lubricant compositions which must meet ever increasing performance demands while being compatible with these alternate refrigerants.

Co-pending U.S. patent application Ser. No. 12/684,315 discloses refrigeration lubricants comprising mixtures of carboxy esters of mono-, di-, tri-, tetra- and higher oligomers of pentaerythritol, wherein at least 25% are esters of tetra-pentaerythritol or higher oligomers, which have the high viscosity and lubricity characteristics needed for use with $CO_2$. Ester mixtures high in carboxy groups containing 7 or more carbons, e.g. n-heptylcarboxy, are preferred. Co-pending U.S. patent application Ser. No. 13/080,739 also discloses high viscosity lubricants useful with $CO_2$, which contain predominately esters of straight chain $C_{3-6}$ linear carboxylic acids, for example, n-pentanoic acid esters, and which comprise 30 wt % or more of esters of pentaerythritol oligomers containing 4 or more pentaerythritol groups.

JP 2003073681 discloses a biodegradable refrigeration working fluid comprising isobutane and a polyol ester, wherein the poly ester is prepared from neopentyl glycol, trimethylol propane and pentaerythritol and at least one $C_{4-8}$ straight chain carboxylic acid and has a kinematic viscosity at 40° C. of 5-20 mm$^2$/g.

JP 2003041278 discloses a refrigeration oil compatible with hydrocarbon refrigerants, e.g., ethane, propane, butane, isobutane etc., the oil comprising one or more polyol ester prepared from one or more $C_{5-10}$ neopentyl polyol such as neopentyl glycol, trimethylol propane, pentaerythritol and di-pentaerythritol and one or more $C_{5-9}$ straight or branched chain carboxylic acid. Examples with a kinematic viscosity at 40° C. of 30-33 mm$^2$/g are shown.

U.S. Pat. No. 7,718,083 discloses a refrigerator oil composition comprising a base oil (A) selected from a polyalkylene glycol, a polyol ester, a poly-α-olefin, an alkylbenzene, and an mineral oil; an organic sulfur compound (B) having a sulfur content of 35% by mass or less; and a refrigerant (C) composed of at least one selected from carbon dioxide, a hydrocarbon, and ammonia.

JP 2010090284 discloses a refrigerator oil composition comprising a hydrocarbon refrigerant and esters of polyols with $C_{10-20}$ straight chain carboxylic acids. JP 2010031134 discloses a compressor which uses a refrigerator oil composition comprising propane as refrigerant and esters of pentaerythritol erythritol and/or di-pentaerythritol with $C_{11-19}$ carboxylic acids.

It has been found that certain mixtures of polyol esters prepared from select polyols and predominately or exclusively straight chain carboxylic acids are highly effective base oils for use as a refrigeration lubricant with hydrocarbon refrigerants. Said polyol ester mixtures have a surprising combination of physical properties, e.g., viscosity, lubricity, etc, and hydrocarbon solubility, ideal for use with hydrocarbon refrigerants in refrigeration working fluids.

SUMMARY OF THE INVENTION

The invention provides a working fluid comprising a $C_{1-6}$ hydrocarbon refrigerant and a polyol ester lubricant, which polyol ester lubricant has a kinematic viscosity at 40° C. of 22-125 cSt, a viscosity index of greater than 140 and comprises a mixture of predominately straight chain alkylcarboxy esters of neopentyl polyols, i.e., $C_{5-10}$ carboxylate esters of neopentyl polyols selected from trimethylol propane, pentaerythritol, di-pentaerythritol, tri-pentaerythritol and pentaerythritol oligomers, wherein most or all of the alkylcarboxy groups are derived from straight chain $C_{5-10}$ carboxylic acids. Often, the polyol ester lubricants have a pour point of less than −40° C. by ASTM D 97. The working fluids of the invention are compatible with standard additives common in the field.

Pentaerythritol based polyol esters of the invention may be conveniently prepared in a two step process by reacting pentaerythritol with less than a stoichiometric amount of carboxylic acid, based on available hydroxyl groups, under strong acid catalysis at elevated temperatures to form a mixture of partial esters of pentaerythritol, dipentaerythritol and higher polypentaerythritols; partial esters being polyol compounds wherein some but not all of the hydroxyl groups are esterified. The amount of oligomerization and viscosity can be controlled by the amount of time the reaction is allowed to proceed and is influenced by the amount of carboxylic acid added, the temperature and other easily varied reaction parameters. After neutralizing the strong acid the remaining hydroxyl groups are esterified in a second step with additional carboxylic acid using standard means.

Polyol esters of the invention can also be prepared by simple esterification of one or more polyols and it is also common to blend separately prepared esters to arrive at the polyol ester mixture of the invention. For example, mixtures of pentaerythritol based polyol esters prepared from the two step process above may be blended with, e.g., $C_{5-10}$ carboxylic acid esters of trimethylol propane in order to adjust the viscosity of the lubricant composition.

In many embodiments, the $C_{5-10}$ carboxylic acids used to form the polyol esters are selected from $C_{7-10}$ carboxylic acids, and often a mixture of acids are used, e.g. the acids may be selected from n-heptanoic, n-octanoic and n-decanoic acid.

DESCRIPTION OF THE INVENTION

A working fluid for a heat transfer device comprising:
i) a $C_{1-6}$ hydrocarbon as a refrigerant, for example, a $C_{1-5}$ hydrocarbon, e.g., a $C_{2-5}$ hydrocarbon, such as ethane, propane, propene, butane, isobutane, butene, iso butene, pentane and iso-pentane, e.g., propane, butane, isobutane, butene and iso butene, or a mixture of said hydrocarbons; and ii) a polyol ester lubricant composition comprising predominately $C_{5-10}$ alkylcarboxlate esters of neopentyl alcohols, for example, $C_{5-10}$ alkylcarboxlate esters of one or more of trimethylol propane, pentaerythritol, di-pentaerythritol, tri-pentaerythritol or pentaerythritol oligomers, wherein a majority, or all, of the alkyl carboxylates are straight chain alkyl carboxylates;

wherein the polyol ester lubricant composition has a kinematic viscosity at 40° C. of 22-125 cSt, and a viscosity index of greater than 140. In many embodiments the polyol ester lubricant has a pour point of less than −40° C. as determined by ASTM D 97.

In one embodiment the polyol ester lubricant composition comprises a mixture of compounds of formula I wherein n is an integer of from 1 to 20, for example, from 1 to 12, or 1 to 10, each R is independently an alkyl carbonyl of from 5 to 10 carbon atoms, wherein a majority are straight chain alkyl carbonyls, each $R_1$ is independently selected and is either a group R or a substituent of formula II:

wherein the polyol ester lubricant composition comprises at least
a) a compound of formula I wherein n is 1 and each $R_1$ is independently selected and is a group R, i.e., mono-pentaerythritol esters, and
b) a compound of formula I wherein n is 2 and each $R_1$ is independently selected and is a group R, i.e., di-pentaerythritol esters;

for example, wherein the polyol ester lubricant composition comprises at least
a) a compound of formula I wherein n is 1 and each $R_1$ is independently selected and is a group R, i.e., mono-pentaerythritol esters,
b) a compound of formula I wherein n is 2 and each $R_1$ is independently selected and is a group R, i.e., di-pentaerythritol esters, and c) a compounds of formula I wherein n is 3 and each $R_1$ is independently selected and is a group R, i.e., tri-pentaerythritol esters;

for example, wherein the polyol ester lubricant composition comprises at least a) a compound of formula I wherein n is 1 and each $R_1$ is independently selected and is a group R, i.e., mono-pentaerythritol esters, b) a compound of formula I wherein n is 2 and each $R_1$ is independently selected and is a group R, i.e., di-pentaerythritol esters, c) a compound of formula I wherein n is 3 and each $R_1$ is independently selected and is a group R, i.e., tri-pentaerythritol esters, and d) a compound of formula I which are pentaerythritol oligomers of 4 or more pentaerythritol monomer groups.

In another embodiment the polyol ester lubricant composition comprises a mixture of compounds of formula I and esters of other neopentyl polyols, such as a mixture of compounds of formula I and predominately straight chain $C_{5-10}$ alkylcarboxlate esters of trimethylol propane.

In one embodiment, the polyol ester lubricant composition comprises a mixture of:

a) from about 30 to about 55 wt %, e.g., about 40 to about 50 wt %, of a compound of formula I wherein n is 1, each $R_1$ is independently selected and is a group R, b) from about 1 to about 20 wt %, e.g., about 10 to about 20 wt %, of a compound of formula I wherein n is 2, each $R_1$ is independently selected and is a group R, c) from about 1 to about 10 wt %, e.g., about 3 to about 10 wt %, of a compound of formula I wherein n is 3, each $R_1$ is independently selected and is a group R, and d) from about 25 to about 45 wt %, e.g., about 30 to about 40 wt %, of a compound of formula I which are pentaerythritol oligomers of 4 or more pentaerythritol monomer groups wherein the wt % is based on all compounds of formula I present in the lubricant composition, and which mixture may be blended with, e.g., trimethylol propane esters of the invention.

In some embodiments, at least 50%, for example 60% for example 75% by weight of all esters in the polyol ester lubricant composition are compounds of formula I, in one embodiment, 90% or more are compounds of formula I. In other embodiments, 50%, 60%, 75%, 90% or more by weight of all esters in the polyol ester lubricant composition are esters of trimethylol propane.

Each R is independently an alkylcarbonyl of 5 to 10 carbon atoms, which can be linear or branched, but typically at least 60 molar % or more of the alkylcarbonyl groups are linear, for example, 75%, 90%, 95 molar % or more of all alkyl carbonyl chains are linear. Often, R is selected from alkylcarbonyls of 7-10 carbon atoms, for example R is selected from alkylcarbonyls of 7, 8 and 10 carbon atoms. In one embodiment, at least 50 molar %, for example, at least 60, 75, 80 or at least 90 molar % are straight chain alkylcarbonyls of 7, 8 and 10 carbon atoms. In one embodiment, essentially all alkylcarbonyls are straight chain alkylcarbonyls of 7, 8 and 10 carbon atoms.

In one particular embodiment, at least 60%, for example, at least 70, 80 or at least 90% or more of esters in the compounds of formula I comprise alkanoyls wherein R is n-heptanoyl.

The carboxy groups of other neopentyl polyol esters in the lubricant composition, e.g., trimethylol propane esters, are selected from the same alkylcarbonyls as described for R in compounds of formula I.

The compounds of formula I which are pentaerythritol oligomers can be linear or branched oligomer. For example, an oligomer of formula I wherein n is 4, i.e., formula III, can be a linear pentaerythritol tetramer if all $R_1$ groups are alkylcarbonyl. However, any number of the $R_1$ groups can be a pentaerythritol group of formula II, and if, for example, the $R_1$ group marked with the arrow is a group of formula II, the result would be a branched pentaerythritol pentamer, i.e., a branched oligomer of 5 pentaerythritol monomer units.

III

Thus, an oligomer of formula I of 4 pentaerythritol monomer units or more does not require that n in formula I is 4 or more. Formula IV represents an oligomer of formula I with 4 pentaerythritol units where n is 3 and one $R_1$ group is a pentaerythritol group:

IV and the compound of formula V is an oligomer of formula I with 5 pentaerythritol units where n is 3 and two groups $R_1$ are pentaerythritol:

V

Other compounds similar to those of formula I described above may be present in the working fluid. For example, incomplete esterification may lead to the presence of compounds wherein one or more R groups are hydrogen and higher oligomers showing greater degrees of branching are also possible depending on the synthetic method used.

The mixture of the above esters may be prepared by simple esterification of the appropriate polyols, e.g., pentaerythritol, dipentaerythritol, and poly(pentaerythritol)s, however this requires obtaining the individual polyols as starting materials.

Polyol esters of the inventive compositions are conveniently prepared by a two step process which incorporates a first step similar to the process described in U.S. Pat. No. 3,670,013. In the first step, pentaerythritol, a strong acid catalyst, and a $C_5$ to $C_{10}$ monocarboxylic acid or mixture of said acids are charged to a reaction vessel such that the mole ratio of carboxyl groups to hydroxyl groups is less than 1:1, for example from about 1:4 to about 1:2. Examples of suitable strong acid catalysts include mineral acids, for example, sulfuric acid, hydrochloric acid, and the like, and sulfonic acids, for example, benzenesulfonic acid, toluenesulfonic acid, polystyrene sulfonic acid, methanesulfonic acid, ethanesulfonic acid, and the like. The reaction mixture is then heated to a temperature of between about 150° C. and about 250° C., typically between about 170° C. and about 200° C., while water vapor is continuously removed from the reaction vessel, generally by the application of a vacuum.

Any carboxylic acid which co-distills with the water vapor may be returned to the reactor or replaced by adding a replacement portion of carboxylic acid. A degree of pentaerythritol oligomerization occurs under the conditions generating a mixture of partial esters of pentaerythritol, di-pentaerythritol, tri-pentaerythritol and higher polypentaerythritols. The amount of oligomerization, and thus the viscosity, can be controlled by the amount of time the reaction of the first step is allowed to proceed at elevated temperatures. This can be determined by experimentation, such as checking the viscosity of the reaction mixture or taking spectroscopic measurements, or may be estimated by collecting an amount of water calculated to correspond to the desired amount of amount of water of reaction liberated by the formation of the ester groups and the pentaerythritol ether linkages formed by dimer or oligomer formation.

Optionally, the acid catalyst is neutralized with alkali at the end of the first reaction step.

The second step of the process completes the esterification of the partial esters. Thus, additional $C_5$ to $C_{10}$ monocarboxylic acid or acid mixture acid and optionally an esterification catalyst is added to the reaction mixture. The additional carboxylic acid can be the same as or different from that used in the initial step and is generally added in amount to provide a 10 to 25 percent excess of carboxyl groups, with respect to hydroxyl groups. The reaction mixture is then heated to complete the esterification under conditions well known for ester formation.

Any known catalyst, or no catalyst may be employed in the second step, such as acid catalysts, acid salts, metal catalysts such as organo metallic catalysts, clays etc. Good results have been obtained using tin oxylate and/or activated carbon and in some instances, no added catalyst was required for the second step.

The resulting mixture of esters may be used without further purification or may be purified using conventional techniques such as distillation, treatment with acid scavengers to remove trace acidity, treatment with moisture scavengers to remove moisture and/or filtration to improve clarity.

Di-pentaerythritol is often present at the beginning of the process, particularly as technical grades of the pentaerythritol starting material often contain some of this dimer. Small amounts of other pentaerythritol oligomers may also be present in the starting materials.

For example, according to the process, 25 moles of pentaerythritol is mixed with approximately 50 moles of n-heptanoic acid. As pentaerythritol contains four hydroxyl groups, this amount of acid represents only half of the stoichiometric equivalence needed for full esterification. A catalytic amount of sulfuric acid or methane sulfonic acid is also added. About 10 milimoles of acid catalyst is often sufficient but there is no limitation on the amount of catalyst used and higher amounts are common. The mixture is stirred or otherwise agitated and heated to about 160 to about 200° C., for example from about 170 to about 180° C., and water is collected, for example in a Dean Stark trap. The amount of time that the reaction is heated depends on how much polymerization is desired.

The reaction is then cooled and the acid catalyst is neutralized by addition of a base, e.g., sodium hydroxide. Carboxylic acid, for example, additional n-heptanoic acid or a mixture of heptanoic acid and other carboxylic acids, sufficient to react with any remaining hydroxyl groups and any optional catalyst is added to complete the esterification. The reaction mixture is the heated with mixing and water is collected until the reaction is complete. In this step the temperature of reaction may vary depending on whether a catalyst is employed and what that catalyst may be therefore temperatures may be encountered that are higher or lower than used in the first step.

The amount of carboxylic acid included in the initial charge can vary widely so long as it is less than the amount needed to esterify all hydroxy groups present. As mentioned above, dipentaerythritol and polypentaerythritol may included in the initial charge of starting materials and when this is the case one must consider different hydroxyl group quantities available on the dimers and polymers when determining the amount of carboxylic acid to add.

One advantage of this process is that one can start with readily available starting materials. Another advantage is that the degree of oligomerization can be controlled by simply varying the length of time the reaction mixture is exposed to strong acids at elevated temperature, which allows one to effectively control the viscosity of the resulting ester composition. That is, longer reaction times at elevated temperature in the first step lead to higher viscosity. The polyol ester compositions containing esters of formula I as defined above are all conveniently prepared by this process.

One may blend the ester product of the preceding process with other neopentyl polyol esters, for example, esters of neopentyl glycol and trimethylol propane, to prepare the lubricant composition. In another embodiment, the lubricant composition comprises esters of trimethylol propane and optionally other neopentyl polyols but not compounds of formula I.

The polyol esters ester can also be blended with other lubricants, such as polyalphaolefins, polyalkylene glycols, alkylated aromatics, polyvinyl ethers, mineral oils, other ester based lubricants, vegetable oils etc to form the lubricant composition, However, the mixture of polyol esters defined above is the majority or sole component of the lubricant composition that is mixed with the hydrocarbon refrigerant to prepare the working fluid and care must be used when adding other lubricant base stocks so that the desirable properties of the polyol ester composition relative to its use with hydrocarbon refrigerants are not diminished.

The lubricant composition has a viscosity, as measured without refrigerant at 40° C., of from about 22 cSt to about 125 cSt, more typically from 25 cSt to 100 cSt, for example, a viscosity as measured without refrigerant at 40° C., of from about 25 to about 60 cSt or from about 25 to about 45 cSt.

It is also important that the viscosity remains as consistent as possible across the typically encountered temperature range. The ester lubricant compositions of the invention also demonstrate consistent viscosity over a wide range of temperatures as shown by their high viscosity indices, e.g., 120 or higher, typically 130 or higher, for example 140 or higher.

Because of their particular combination of physical properties, the polyol ester lubricant compositions of the invention are ideally suited for working fluids containing hydrocarbon refrigerants. Other similar polyol ester lubricants possess a variety of useful properties, but do not exhibit the full compliment of performance criteria, that is, both lubricating properties and hydrocarbon miscibility, that are needed for a hydrocarbon based working fluid and found in the ester mixtures of the invention.

The mixing ratio of the polyol ester lubricant to the refrigerant is not particularly restricted, but the lubricant may be present in a ratio of 1 to 500 parts by weight, more preferably 2 to 400 parts by weight per 100 parts by weight of the refrigerant. In one embodiment the working fluid comprises about 5 to 20 weight percent of the ester lubricant based on the weight of lubricant and refrigerant.

The working fluids of the invention can comprise other components common to the art, including additives, other lubricants, and refrigerants in addition to the hydrocarbon.

For example, other refrigerants which may be present in the working fluid include $CO_2$, halocarbons, ammonia and the like, but in many embodiments of the invention the $C_{1-6}$ hydrocarbon is the majority refrigerant, and often, the hydrocarbon is the only refrigerant.

Halocarbon refrigerants include fluorocarbon and hydrofluorocarbon compounds such as carbon tetrafluoride (R-14), difluoromethane (R-32), 1,1,1,2-tetrafluoroethane (R-134a), 1,1,2,2-tetrafluoroethane (R-134), pentafluoroethane (R-125), 1,1,1-trifluoroethane (R-143a) and tetrafluoropropene (R-1234yf) and mixtures comprising fluorocarbons, hydrofluorocarbons and/or hydrocarbons are well known and may be used in the present working fluids.

Common additives which may also be present in the working fluid include antioxidants, extreme-pressure additives, antiwear additives, friction reducing additives, defoaming agents, profoaming agents, metal deactivators, acid scavengers and the like.

Examples of the antioxidants that can be used include phenolic antioxidants such as 2,6-di-t-butyl-4-methylphenol and 4,4'-methylenebis(2,6-di-t-butylphenol); amine antioxidants such as p,p-dioctylphenylamine, monooctyldiphenylamine, phenothiazine, 3,7-dioctylphenothiazine, phenyl-1-naphthylamine, phenyl-2-naphthylamine, alkylphenyl-1-naphthylamine, and alkylphenyl-2-naphthylamine; sulfur-containing antioxidants such as alkyl disulfide, thiodipropionic acid esters and benzothiazole; and zinc dialkyl dithiophosphate and zinc diaryl dithiophosphate.

Examples of the extreme-pressure additives, antiwear additives, friction reducing additives that can be used include zinc compounds such as zinc dialkyl dithiophosphate and zinc diaryl dithiophosphate; sulfur compounds such as thiodipropionic acid esters, dialkyl sulfide, dibenzyl sulfide, dialkyl polysulfide, alkylmercaptan, dibenzothiophene and 2,2'-dithiobis(benzothiazole); sulfur/nitrogen ashless antiwear additives such as dialkyldimercaptothiadiazoles and methylenebis(N,N-dialkyldithiocarbamates); phosphorus compounds such as triaryl phosphates such as tricresyl phosphate and trialkyl phosphates; dialkyl or diaryl phosphates; trialkyl or triaryl phosphites; amine salts of alkyl and dialkylphosphoric acid esters such as the dodecylamine salt of dimethylphosphoric acid ester; dialkyl or diaryl phosphites; monoalkyl or monoaryl phosphites; fluorine compounds such as perfluoroalkyl polyethers, trifluorochloroethylene polymers and graphite fluoride; silicon compounds such as a fatty acid-modified silicone; molybdenum disulfide, graphite, and the like. Examples of organic friction modifiers include long chain fatty amines and glycerol esters.

Examples of the defoaming and profoaming agents that can be used include silicone oils such as dimethylpolysiloxane and organosilicates such as diethyl silicate. Examples of the metal deactivators that can be used include benzotriazole, tolyltriazole, alizarin, quinizarin and mercaptobenzothiazole. Furthermore, epoxy compounds such as phenyl glycidyl ethers, alkyl glycidyl ethers, alkylglycidyl esters, epoxystearic acid esters and epoxidized vegetable oil, organotin compounds and boron compounds may be added as acid scavengers or stabilizers.

Examples of moisture scavengers include trialkylorthoformates such as trimethylorthoformate and triethylorthoformate, ketals such as 1,3-dioxacyclopentane, and amino ketals such as 2,2-dialkyloxazolidines.

The working fluids comprising the present polyol esters and a refrigerant can be used in a wide variety of refrigeration and heat energy transfer applications. Non-limiting examples include all ranges of air conditioning equipment from small window air conditioners, centralized home air conditioning units to light industrial air conditioners and large industrial units for factories, office buildings, apartment buildings and warehouses. Refrigeration applications include small home appliances such as home refrigerators, freezers, water coolers, vending machines and icemakers to large scale refrigerated warehouses and ice skating rinks. Also included in industrial applications would be cascade grocery store refrigeration and freezer systems. Heat energy transfer applications include heat pumps for house hold heating and hot water heaters. Transportation related applications include automotive and truck air conditioning, refrigerated semi-trailers as well as refrigerated marine and rail shipping containers.

Types of compressors useful for the above applications can be classified into two broad categories; positive displacement and dynamic compressors. Positive displacement compressors increase refrigerant vapor pressure by reducing the volume of the compression chamber through work applied to the compressor's mechanism. Positive displacement compressors include many styles of compressors currently in use, such as reciprocating, rotary (rolling piston, rotary vane, single screw, twin screw), and orbital (scroll or trochoidal). Dynamic compressors increase refrigerant vapor pressure by continuous transfer of kinetic energy from the rotating member to the vapor, followed by conversion of this energy into a pressure rise. Centrifugal compressors function based on these principles.

EXAMPLES

Preparation of the Esters and Comparative Examples

Example 1

Polypentaerythritol Ester

To a reactor equipped with a mechanical stirrer, thermocouple, thermoregulator, Dean Stark trap, condenser, nitrogen sparger, and vacuum source was charged 392 grams pentaerythritol (2.88 moles), 720 grams n-heptanoic acid (5.54 moles) and a strong acid catalyst. The initial charge had a mole ratio of carboxyl groups to hydroxyl groups of 1:2.08 and the expected water of esterification from the initial charge was 5.54 moles, or about 100 grams. The mixture was heated to a temperature of about 170° C., vaccuum was applied and water of reaction was collected in the trap and any collected acid was returned to the reactor.

After 125 ml of water was collected the reaction mixture containing partial esters of pentaerythritol, dipentaerythritol, tripentaerythritol, tetrapentaerythritol, and higher oligomer esters of pentaerythritol was cooled to about 134° C., an additional 236.6 grams (1.82 moles) of n-heptanoic acid was added, along with 264.4 grams (2.05 moles) of a 6:4 blend of n-octanoic:n-decanoic acids and an amount of alkali sufficient to neutralize the strong acid catalyst used in the first step. The reaction mixture was heated to 240° C. for about 8 hours, during which time 173 ml water was collected and after which time the hydroxyl value was 6.4 mg KOH/g.

The reaction mixture was held at 240° C. for about 3 additional hours, under vacuum to remove excess acid until the acid value was less than 1.0 mg KOH/g. The mixture was cooled to 80° C. and residual acidity was neutralized with alkali. The viscosity at 40° C. was 140 cSt and at 100° C. was 19.6 cSt.

To the reaction product was added approximately 275 grams of a technical pentaerythritol ester of n-heptanoic, n-octanoic acid and n-decanoic acid to obtain a mixture of approximately 47% mono-pentaerythritol esters, 14% di-pentaerythritol esters, 7% tri-pentaerythritol esters and 32% esters of pentaerythritol oligomers of 4 or more pentaerythritol monomer groups. The resulting product was dried and filtered and displayed a target kinematic viscosity at 40° C. of 80 cSt.

Example 2

Trimethylolpropane Ester of Caprylic Acid

To a reactor equipped with a mechanical stirrer, thermocouple, thermoregulator, Dean Stark trap, condenser, nitrogen sparger, and vacuum source was charged trimethylol propane and an approximately 15 molar % excess of caprylic acid (which is a 6:4 blend of n-octanoic:n-decanoic acids).

The reaction mixture was heated at 240° C., vaccuum was applied and water of reaction was collected in the trap and any collected acid was returned to the reactor. The reaction was held at 240° C. until the hydroxyl value dropped to below 2.5 mg KOH/gram. The reaction was then held at 240° C. for about 3 additional hours, with vacuum being applied to remove excess acid until the acid value was less than 1.0 mg KOH/g. The mixture was cooled to 80° C. and residual acidity was neutralized with alkali. The kinematic viscosity of the polyester product at 40° C. was 19 cSt and at 100° C. was 4.4 cSt.

Example 3

The esters of Example 1 and Example 2 were blended in a ratio of 2:3 to give a blended polyol ester with a kinematic viscosity at 40° C. of about 32 cSt. The physical properties of the product are given in Table 1.

Example 4

Pentaerythritol Ester of Caprylic Acid

To a reactor equipped with a mechanical stirrer, thermocouple, thermoregulator, Dean Stark trap, condenser, nitrogen sparger, and vacuum source was charged technical grade pentaerythritol (90 wt % pentaerythritol and 10 wt % dipentaerythritol) and an approximately 15 molar % excess of caprylic acid (which is a 6:4 blend of n-octanoic:n-decanoic acids).

The reaction mixture was held at 240° C. for about 3 additional hours, under vacuum to remove excess acid until the acid value was less than 2.5 mg KOH/g. The mixture was cooled to 80° C. and residual acidity was neutralized with alkali. The kinematic viscosity of the polyester product at 40° C. was 31 cSt and at 100° C. was 6.2 cSt. The physical properties for the product are given in Table 1.

Comparative Example 1

Comparative Example 1 is a 84:16, wt:wt blend of two polyol esters having kinematic viscosities at 40° C. of 7.5 cSt and 44 cSt. The 7.5 cSt ester is the reaction product of neopentyl glycol with 2-ethylhexanoic acid. The 44 cSt ester is the reaction product of pentaerythritol with 2-ethylhexanoic acid. Physical properties are given in Table 1.

Comparative Example 2

Comparative Example 2 is an ISO 32 grade alkylated benzene commercially available from Virginia KMP Corporation as SPECIAL DUTY AB150. Physical properties for the product are given in Table 1.

TABLE 1

Physical Properties of the Examples and Comparative Examples

|  | Ex 3 | Ex 4 | Comp Ex 1 | Comp Ex 2 |
|---|---|---|---|---|
| ISO Viscosity Grade | 32 | 32 | 32 | 32 |
| Kinematic Viscosity, 40° C. (cSt) | 31.9 | 31 | 32 | 31.3 |
| Kinematic Viscosity, 100° C. (cSt) | 6.31 | 6.2 | — | 4.15 |
| Viscosity Index | 153 | 154 | <80 | <70 |
| Total Acid Number (mg KOH/g) | <0.05 | <0.05 | <0.05 | 0.05 |
| Specific Gravity @ 15.6° C./15.6° C. | 0.964 | 0.963 | 0.927 | 0.870 |
| Density at 15.6° C. (lbs./USG) | 8.03 | 8.02 | 7.72 | 7.24 |
| Flash Point, COC (° C.) | 263 | 282 | 185 | 205 |
| Pour Point (° C.) | −60 | −7 | −45 | −45 |

Load Carrying Performance

Extreme pressure load carrying performance of the lubricant under boundary lubricant conditions (direct metal-to-metal contact).

A steel journal held in place by a brass shear pin is rotated against two stationary V-blocks to give a four-line contact. The test pieces and their supporting jaws are immersed in the oil sample cup for oil lubricants. The journal is driven at 250 rpm and load is applied to the V-blocks through a nutcracker action lever arm and spring gage. The load is actuated and ramped continuously during the test by means of a ratchet wheel mechanism until the brass shear pin shears or the test pin breaks. The torque is reported in pounds from the gauge attached to the Falex lubricant tester (Table 2). The results of the load carrying test demonstrate the superior load carrying performance of the lubricants of the invention when compared to a typical branched acid polyol ester lubricant and an alkylated benzene lubricant.

TABLE 2

ASTM D 3233, Method A Falex Pin and Vee Block Test Results

| | Direct Load, lbs. |
|---|---|
| Example 3 | >1000 |
| Example 4 | >1000 |
| Comparative Example 1 | 750 |
| Comparative Example 2 | Failed During Run in Period |

Lubricity Performance

The lubricity of the lubricants was evaluated using a mini-traction machine (MTM) commercially available from PCS Instruments. This test measures the lubricity/frictional properties of lubricants by two different techniques using a rotating ball-on-disk geometry. In the first mode of operation, the lubricity is measured over the total range of lubrication regimes including boundary (metal-to-metal contact), mixed film (mixture of fluid film and metal contact), elastohydrodynamic (fluid film) and hydrodynamic (fluid film). The speed of the ball and disk are ramped simultaneously at a slide-roll-ratio of 50% and the coefficient of friction is measured as a function of entrainment speed at constant load and temperature. This means that the ball is always moving at 50% of the speed of the rotating disk as the speed of the disk is ramped. As the speed of the disk and ball are increased there is a pressure build up at the front of the rolling/sliding contact due to the movement of the lubricant to ether side of the metal-metal contact. At some point the speed becomes fast enough and the pressure becomes sufficient to result in lubricant entrainment between the ball and the disk contact. At this point the system is under hydrodynamic lubrication; meaning that the lubrication is controlled by the integrity of the film between the ball and disk. A lower coefficient of friction at high entrainment speeds indicates a lubricant with better lubricity performance. Table 3 lists the coefficient of friction at various entrainment speeds for Example 1, Comaparative Example 1 and Comparative Example 2 at 40° C., 80° C. and 120° C.

TABLE 3

Coefficient of Friction @ Entrainment Speed (mm/sec)

| | 10 mm/s | 100 mm/s | 1000 mm/s |
|---|---|---|---|
| 40° C. | | | |
| Ex 1 | 0.052 | 0.036 | 0.033 |
| Comp Ex 1 | 0.071 | 0.052 | 0.048 |
| Comp Ex 2 | 0.089 | 0.081 | 0.073 |
| 80° C. | | | |
| Ex 1 | 0.066 | 0.032 | 0.020 |
| Comp Ex 1 | 0.084 | 0.044 | 0.032 |
| Comp Ex 2 | 0.096 | 0.070 | 0.058 |
| 120° C. | | | |
| Ex 1 | 0.090 | 0.050 | 0.014 |
| Comp Ex 1 | 0.090 | 0.066 | 0.024 |
| Comp Ex 2 | 0.100 | 0.072 | 0.046 |

In the second mode of operation, the lubricity of the lubricant is measured under full fluid film conditions (hydrodynamic lubrication). In this test, the coefficient of friction is measured at constant load and temperature at various slide/roll ratios (i.e., the ball and disk are rotated at different speeds relative to one another). For both modes of operation the test is typically conducted at several different fixed temperatures; in this case 40, 80 and 120° C. and a load of 30 N. Coefficient of friction is a direct measurement of the lubricity of the lubricant; the lower the coefficient of friction, the higher the lubricity of the lubricant. It is important to note that for this test it usually only meaningful to compare lubricants of equivalent ISO viscosity grade. Table 4 lists the coefficient of friction at various slide roll ratios for Example 1, Comaparative Example 1 and Comparative Example 2 at 40° C., 80° C. and 120° C.

TABLE 4

Coefficient of Friction @ Slide Roll Ratio

| | 10% | 30% | 50% | 70% |
|---|---|---|---|---|
| 40° C. | | | | |
| Ex 1 | 0.022 | 0.030 | 0.032 | 0.032 |
| Comp Ex 1 | 0.037 | 0.044 | 0.045 | 0.042 |
| Comp Ex 2 | 0.065 | 0.067 | 0.064 | 0.061 |
| 80° C. | | | | |
| Ex 1 | 0.008 | 0.016 | 0.020 | 0.023 |
| Comp Ex 1 | 0.017 | 0.028 | 0.032 | 0.033 |
| Comp Ex 2 | 0.047 | 0.055 | 0.056 | 0.055 |
| 120° C. | | | | |
| Ex 1 | 0.004 | 0.008 | 0.013 | 0.015 |
| Comp Ex 1 | 0.007 | 0.015 | 0.019 | 0.023 |
| Comp Ex 2 | 0.026 | 0.037 | 0.042 | 0.044 |

The coefficient of friction is consistently lower for the lubricants of the invention vs. the comparative lubricant.

Thermophysical Properties of Lubricant/Propane Mixtures

The apparatus for measuring the viscosity and composition of lubricant/propane mixtures as a function of temperature and pressure consists of a temperature controlled circulation loop containing a pump, mass flow/density meter, high pressure viscometer, bulk lubricant/refrigerant reservoir and pressure transducer. Thermocouples are located at multiple locations in the loop as well as directly in the mass flow meter and viscometer. The design of the loop allows for continuous circulation of the liquid mixture and provides agitation to achieve rapid vapor-liquid equilibrium. The lubricant was first charged to the system gravimetrically (±0.02 grams) and the circulation loop cooled to −10° C. The propane was next charged gravimetrically (±0.02 grams) from a small stainless steel sample cylinder in an amount necessary to achieve the desired bulk propane/lubricant composition. For safety reasons the loop was not filled to capacity and a small vapor space existed at the top of the bulk reservoir, so a vapor space correction was applied to the composition to account for propane in the vapor phase. Once the system was charged, a gear pump was used to circulate the liquid through each of the measurement devices. The bulk mixture pressure was measured to ±0.20 Bar. The liquid density was measured to ±0.002 g/cc with a Micromotion CMF 10 mass flow meter. The liquid viscosity was measured to ±1.0% of value using a Cambridge Viscosity high pressure electromagnetic viscometer. Incorporated into the viscometer housing are two high pressure sight glasses to allow observation of the liquid miscibility where, if bulk mixture pressure is within 1% of saturated refrigerant pressure, the mixture can be checked for possible phase separation. Measurements were collected in the temperature range from −10° C. to 120° C. (±0.5° C.) and compositions of propane in lubricant from 0 to 20 wt %.

Figure 1:
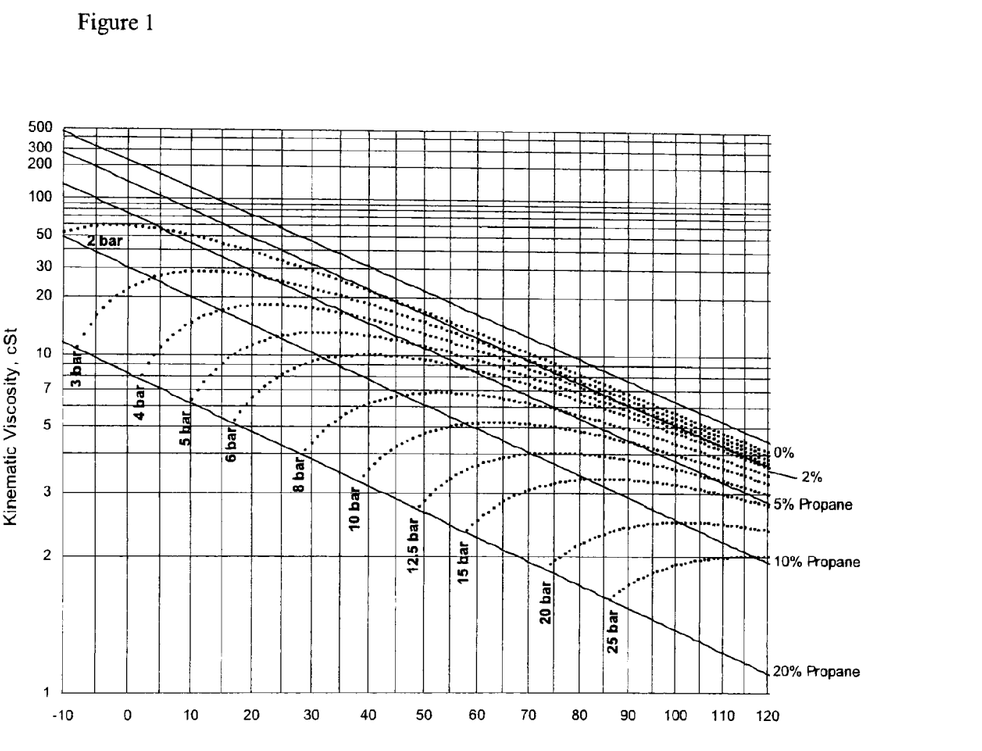
FIG. 1. Daniel Chart relating kinematic viscosity to temperature, pressure (isobaric curved lines) and composition (straight lines) for propane solutions with the lubricant mixture of Example 1.
Figure 2:
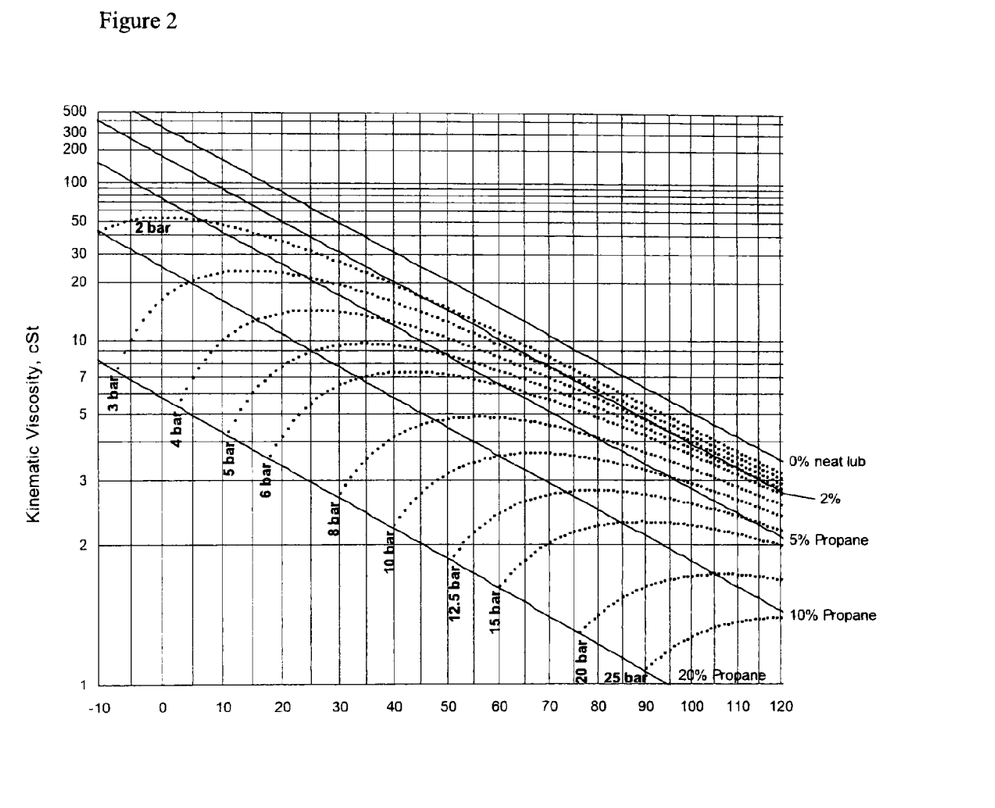
FIG. 2. Daniel Chart relating kinematic viscosity to temperature, pressure and composition for propane solutions with the lubricant mixture of Comparative Example 1.
Figure 3:
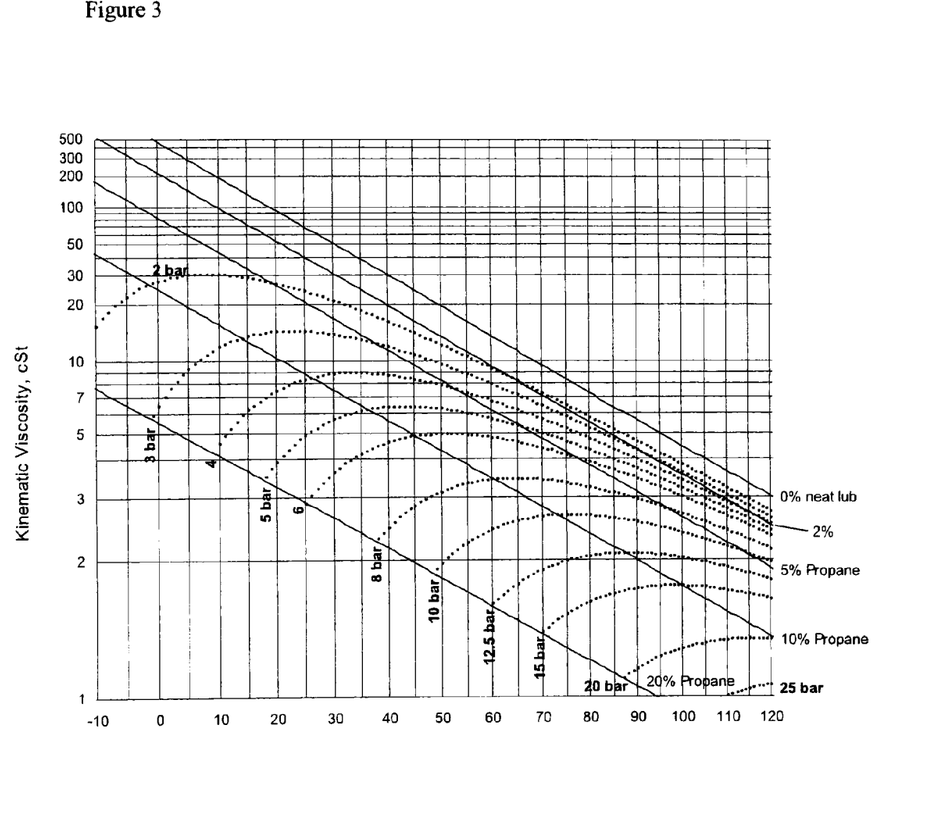
FIG. 3. Daniel Chart relating kinematic viscosity to temperature, pressure and composition for propane solutions with the lubricant mixture of Comparative Example 2.

Daniel Charts were created for each of the lubricants (FIGS. 1-3), which relate the kinematic viscosity of the refrigerant/lubricant mixtures to temperature, pressure (isobaric curved lines) and composition (straight lines). Compari- son of the charts demonstrates that propane solutions with the lubricant of Example 1, see FIG. 1, exhibit a higher kinematic viscosity at high temperatures at any given pressure/temperature combination (i.e., there is less refrigerant dilution) than propane solutions with the lubricant of Comparative Example 1, see FIG. 2, or Comparative Example 2, see FIG. 3. In addition, the lubricant/propane mixtures of the present invention generally have a lower viscosity at low temperatures and low refrigerant concentrations (conditions typically observed in the compressor environment at start up). This lower viscosity means that the lubricant will impart less viscous drag to the compressor which will result in less energy consumption, especially at start up.

What is claimed:

1. A working fluid for a heat transfer device comprising:
   i) a $C_{1-6}$ hydrocarbon refrigerant and
   ii) a polyol ester lubricant composition having a kinematic viscosity at 40° C. of 22-125 cSt, a viscosity index of greater than 140 and comprising a mixture of compounds of formula I wherein n is an integer of from 1 to 12,
each R is independently an alkyl carbonyl of from 5 to 10 carbon atoms,
each $R_1$ is independently selected and is either a group R or a substituent of formula II:

wherein at least 80 molar % of all R groups are independently selected from straight chain alkylcarbonyls of from 7 to 10 carbon atoms, and wherein the polyol ester lubricant composition comprises
   a) from about 30 to about 55 wt % of a compound of formula I wherein n is 1 and each $R_1$ is independently selected and is a group R,
   b) from about 1 to about 20 wt % of a compound of formula I wherein n is 2 and each $R_1$ is independently selected and is a group R,
   c) from about 1 to about 10 wt % of a compound of formula I wherein n is 3 and each $R_1$ is independently selected and is a group R, and
   d) from about 25 to about 45 wt % of a compound of formula I which are pentaerythritol oligomers of 4 or more pentaerythritol monomer groups,
wherein the wt % is based on the weight of all compounds of formula I present in the lubricant composition.

2. The working fluid according to claim 1 wherein at least 90 molar % of all R groups are independently selected from straight chain alkylcarbonyls of 7, 8 and 10 carbon atoms.

3. The working fluid according to claim 1 wherein the $C_{1-6}$ hydrocarbon refrigerant is the only refrigerant present and is one or more refrigerants selected from the group consisting of ethane, propane, propene, butane, isobutane, butene, iso butene, pentane and iso-pentane.

4. The working fluid according to claim 3 wherein the refrigerant is one or more refrigerants selected from the group consisting of propane, butane, isobutane, butene and iso butene.

5. The working fluid according to claim 1 further comprising in addition to components i) and ii), one or more compounds selected from the group consisting of mineral oils, poly-α-olefins, alkylbenzenes, carboxylic acid esters other than a compound of formula I, polyethers, polyvinyl ethers, perfluoropolyethers, and phosphoric acid esters.

6. The working fluid according to claim 1 further comprising one or more antioxidant, extreme-pressure additive, anti-wear additive, friction reducing additive, defoaming agent, profoaming agent, metal deactivator, acid scavenger or mixture thereof.

7. The working fluid according to claim 1, wherein the polyol ester lubricant composition comprises a mixture of compounds of formula I and $C_{5-10}$ alkylcarboxlate esters of trimethylol propane wherein at least 80 molar % of all alkyl carbonyls in the esters of trimethyl polyol are independently selected from straight chain alkylcarbonyls of from 7 to 10 carbon atoms.

8. The working fluid according to claim 7 wherein at least 50% by weight of all esters in the polyol ester lubricant composition are compounds of formula I.

9. The working fluid according to claim 7 wherein at least 75% by weight of all esters in the polyol ester lubricant composition are compounds of formula I.

10. The working fluid according to claim 1 wherein at least 90% by weight of all esters in the polyol ester lubricant composition are compounds of formula I.

* * * * *